United States Patent [19]

Ohama et al.

[11] Patent Number: 5,438,080
[45] Date of Patent: Aug. 1, 1995

[54] ULTRAVIOLET-CURABLE COATING COMPOSITION

[75] Inventors: Yoshifumi Ohama, Hyogo; Yoshihide Chihara, Osaka; Yasufumi Honda, Hyogo; Yasuhiro Miyamoto, Hyogo, all of Japan

[73] Assignee: Nippon Oil and Fats Co., Ltd., Tokyo, Japan

[21] Appl. No.: 946,778

[22] Filed: Sep. 18, 1992

Related U.S. Application Data

[63] Continuation of Ser. No. 842,771, Mar. 2, 1992, abandoned, which is a continuation of Ser. No. 449,406, Dec. 19, 1989, abandoned, which is a continuation of Ser. No. 54,691, May 27, 1987, abandoned.

[30] Foreign Application Priority Data

May 27, 1986 [JP] Japan .................. 61-120158
Apr. 10, 1987 [JP] Japan .................. 62-88479

[51] Int. Cl.$^6$ .............................................. C08F 2/46
[52] U.S. Cl. ................................. 522/97; 522/90; 522/174
[58] Field of Search ................... 522/97, 174, 90

[56] References Cited

U.S. PATENT DOCUMENTS

| | | | |
|---|---|---|---|
| 3,622,334 | 11/1971 | Hurley | 522/50 |
| 3,891,523 | 6/1975 | Hisamatsu | 522/96 |
| 4,138,299 | 2/1979 | Bolgiano | 522/96 |
| 4,212,901 | 7/1980 | Neerbos | 522/102 |
| 4,265,723 | 5/1981 | Hesse | 522/64 |
| 4,393,094 | 7/1983 | Garrett | 522/96 |
| 4,415,604 | 11/1983 | Nativi | 522/174 |
| 4,424,252 | 1/1984 | Nativi | 428/901 |
| 4,708,924 | 11/1987 | Nagai | 430/138 |

FOREIGN PATENT DOCUMENTS

| | | |
|---|---|---|
| 1256630 | 6/1989 | Canada . |
| 0000407 | 1/1979 | European Pat. Off. . |
| 59-130568 | 7/1984 | Japan . |
| 2109385 | 6/1983 | United Kingdom . |

OTHER PUBLICATIONS

Yamada, "A Surface Protection Layer" PTO 94–1324, A Translation of Japanese Kokai 59–130586, 14 pp. The Merck Index, Seventh Ed., Merck & Co., Inc. 1960 p. 537.
Chemical Abstract #97052d of vol. 102 1985.
Chemical Abstracts, vol. 102, No. 12, Mar. 1985, p. 66, Abstract No. 97052d Nitto.

Primary Examiner—Mark A. Chapman
Attorney, Agent, or Firm—Sughrue, Mion, Zinn, Macpeak & Seas

[57] ABSTRACT

A ultraviolet-curable coating composition is disclosed, which comprises a specific ultraviolet-curable polyfunctional (meth)acrylate, a specific urethane-curing polymer, and a specific polyisocyanate compound in a specific compounding ratio and having incorporated therein a photo stabilizer and a photopolymerization initiator. The composition provides a coating film of large thickness in one operation and is sufficiently cured even with non-uniform ultraviolet radiation and the coating film obtained from such a composition fully satisfies various requirements, such as appearance, adhesion, and weathering resistance.

13 Claims, No Drawings

ULTRAVIOLET-CURABLE COATING COMPOSITION

This is a Continuation of application Ser. No. 07/842,771 filed on Mar. 2, 1992, now abandoned which is a continuation of prior application Ser. No. 07/449,406 filed Dec. 19, 1989 (now abandoned), which in turn is a continuation of prior application Ser. No. 07/054,691 filed May 27, 1987 (now abandoned).

FIELD OF THE INVENTION

This invention relates to a ultraviolet-curable coating composition which can be coated in large film thickness in one operation and be cured sufficiently even with insufficient ultraviolet irradiation to form a cured film excellent in appearance (distinctness of image gloss), adhesion, weathering resistance, and the like.

BACKGROUND OF THE INVENTION

Solvent type or water-soluble type acrylic/melamine resin coatings and acrylic/urethane resin coatings have widely been employed as coatings for vehicle bodies which are required to have a highly attractive appearance as well as other various coating performances. In recent years, photo-curable coatings and radiation-curable coatings have been proposed in addition to the above-described coatings curable by crosslinking. The photo-curing coatings include a composition comprising a modified isocyanate having an ethylenical double bond and an isocyanate group and a hydroxyl-containing prepolymer as disclosed in Japanese Patent Application (OPI) No. 66596/75 (the term "OPI" as used herein means "unexamined published application"). The radiation-curable coatings include a composition comprising an ethylenic polymer having a (meth)acrylic ester and a hydroxyl group, a vinyl polymer, and a photo initiator as basic components and, in addition, a reaction product between the basic components and a polyisocyanate compound as disclosed in Japanese Patent Application (OPI) No. 17967/79.

The aforesaid acrylic/melamine resin coatings and acrylic/urethane resin coatings do not necessarily exhibit satisfactory appearance and find difficulty in coating thickly. A high film thickness may be attained by increasing a non-volatile residue, i.e., total solids, of a coating. However, means generally taken to this effect, such as reduction of molecular weight of resinous components to decrease the viscosity, result in deterioration of workability of the coating and physical properties, chemical resistance, and weathering resistance of a coating film.

On the other hand, the photo-curable coatings or radiation-curable coatings are easily obtained high film thickness and their coating films are excellent in appearance. However, they show poor adhesion to a substrate due to great distortion upon curing. Moreover, sufficient curing cannot be achieved on areas where ultraviolet radiation is insufficient so that satisfactory weathering resistance cannot be always assured.

SUMMARY OF THE INVENTION

Accordingly, an object of this invention is to provide a ultraviolet-curable coating composition which can be obtained in high film thickness in one coating, can be cured sufficiently even when ultraviolet irradiation is non-uniform, and can provide a high quality coating film excellent in appearance, adhesion to a substrate, weathering resistance, and the like.

As a result of extensive investigations to accomplish the above object, it has now been found that a composition comprising a specific ultraviolet-curable polyfunctional (meth)acrylate, a specific urethane-curing polymer, and a specific polyisocyanate compound in a specific compounding ratio and having incorporated therein a photo stabilizer and a photopolymerization initiator provides a coating film of high thickness in one coating and is sufficiently cured even with non-uniform ultraviolet radiation and that the coating film obtained from such a composition fully satisfies various requirements, such as appearance, adhesion, and weathering resistance. The present invention has been completed based on these findings.

The present invention relates to a ultraviolet-curable coating composition comprising:—

(A) a ultraviolet-curable polyfunctional acrylate and/or methacrylate (hereinafter inclusively referred to as (meth)acrylate) containing at least two acryloyl and/or methacryloyl groups (hereinafter inclusively referred to as (meth)acryloyl groups) in the molecule thereof and having a number average molecular weight of from 190 to 2,000, (B) a polyhydric alcohol mono(meth)acrylate polymer having a hydroxyl number of from 10 to 200, (C) a non-yellowing polyisocyanate compound, (D) a photo stabilizer, and (E) a photopolymerization initiator, wherein said components (A), Or (B), and (C) are present in an amount of from 20 to 80% by weight based on the total amount of the components (A), (B), and (C) with said component (C) having an isocyanate equivalent of from 0.2 to 1.5 per hydroxyl equivalent of the component (B), said composition providing a cured film having a gloss retention of 90% or more and a color difference ΔE* of 2 or less when tested with a sunshine weatherometer for an exposure time of 1,000 hours.

DETAILED DESCRIPTION OF THE INVENTION

The term "(meth)acryloyl group" as used herein means an acryloyl group and/or a methacryloyl group represented by the formula

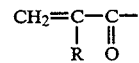

wherein R represents a hydrogen atom or a methyl group.

The polyfunctional (meth)acrylate which can be used as component (A) in the present invention is a ultraviolet-curable compound having at least two (meth)acryloyl groups in the molecule and a number average molecular weight of from 190 to 2,000. If the number of a (meth)acryloyl group per molecule is less than 2, curing properties of the resulting composition become insufficient. If the number average molecular weight exceeds 2,000, neither an improvement in appearance nor assurance of curing properties can be attained. If it is less than 190, the resulting coating film exhibits poor flexibility.

The polyfunctional (meth)acrylate to be used in the present invention includes not only polyhydric esters between polyhydric alcohols and acrylic acid and/or methacrylic acid (hereinafter inclusively referred to as (meth)acrylic acid) but various (meth)acrylate compounds hereinafter described. These polyfunctional (meth)acrylates can be used either individually or in combinations of two or more thereof.

Specific examples of the aforesaid polyhydric esters are 1,3-butanediol di(meth)acrylate, diethylene glycol di(meth)acrylate, polyethylene glycol di(meth)acrylate, hydroxypivalic ester neopentyl glycol di(meth)acrylate, trimethylolpropane tri(meth)acrylate, pentaerythritol tri(meth)acrylate, dipentaerythritol hexa(meth)acrylate, etc.

Examples of (meth)acrylate compounds other than the above-enumerated polyhydric esters include polyester acrylates composed of n mols of adipic acid, (n+1) mols of hexanediol, and 2 mols of (meth)acrylic acid; epoxy (meth)acrylates obtained by esterifying an epoxy group of an alicyclic epoxy compound with (meth)acrylic acid; polyurethane (meth)acrylates obtained by reacting hexamethylene diisocyanate with a (meth)acrylate having a hydroxyl group, e.g., hydroxyethyl acrylate; melamine (meth)acrylate obtained by reacting a methylol group of methylolmelamine with hydroxyethyl (meth)acrylate; etc.

Of these polyfunctional (meth)acrylates, those containing an acryloyl group in their molecule are particularly preferred because they bring more satisfactory results in curing properties as compared with those containing a methacryloyl group. It is most preferred to use a polyfunctional acrylate containing 3 or more acryloyl groups in the molecule either alone or in combination with a polyfunctional acrylate containing two acryloyl groups in the molecule.

The polyhydric alcohol mono(meth)acrylate polymer which can be used as the component (B) includes homopolymers or copolymers of hydroxyl-containing monomers, e.g., hydroxyethyl (meth)acrylate, hydroxypropyl (meth)acrylate, polyethylene glycol mono(meth)acrylate, polypropylene glycol mono(meth)acrylate, neopentyl glycol mono(meth)acrylate, glycerin mono(meth)acrylate, etc., or copolymers comprising these monomers and one or more of other monomers copolymerizable therewith, e.g., methyl (meth)acrylate, ethyl (meth)acrylate, propyl (meth)acrylate, butyl (meth)acrylate, 2-ethylhexyl (meth)acrylate, styrene, etc.

Preferred of these polymers are copolymers comprising 2-hydroxyethyl (meth)acrylate and/or 2-hydroxypropyl (meth)acrylate as a hydroxyl-containing monomer and the aforesaid copolymerizable monomer(s).

The hydroxyl number of the component (B) is limited to a range of from 10 to 200. If it is less than 10, curing properties are not satisfied in some cases. If it exceeds 200, there is a fear that various performance properties, such as coating film appearance, adhesion, and weathering resistance, may be impaired.

The molecular weight of the component (B) is not particularly limited but usually ranges from about 2,000 to about 20,000.

The non-yellowing polyisocyanate compound which can be used as the component (C) preferably includes polymers of hexamethylene diisocyanate and/or isophorone diisocyanate, that is, a homopolymer of hexamethylene diisocyanate, a homopolymer of isophorone diisocyanate, a copolymer of hexamethylene diisocyanate and isophorone diisocyanate, and a mixture thereof. Blocked isocyanate compounds of these polymers wherein the isocyanate group is masked with a hydroxyl-containing compound, etc., are also preferred.

In addition, other various polyisocyanate compounds known to be non-yellowing, such as polymers of other diisocyanate compounds than those recited above, can also be used.

The components (A), (B), and (C) should be used in such proportions that the component (A) be present in an amount of from 20 to 80% by weight, and preferably from 30 to 70% by weight, based on the total amount of these three components and the components (B) and (C) are present in an amount of from 80 to 20% by weight, and preferably from 70 to 30% by weight, based on the total amount of the three components, with the isocyanate equivalent in the component (C) ranging from 0.2 to 1.5, and preferably from 0.4 to 1.2, per hydroxyl equivalent in the component (B).

If the proportion of the component (A) in the total amount of the three components (A) to (C) is less than 20% by weight, the resulting composition tends to undergo deterioration in curing properties and appearance of a cured film and find difficulty in coating in large thickness through one coating operation. If, on the other hand, it exceeds 80% by weight, the coating film suffers from considerable distortion due to shrinkage on curing, resulting in a reduction of adhesive properties and weathering resistance. When the isocyanate equivalent of the component (C) is less than 0.2 per hydroxyl equivalent of the component (B), curing properties become insufficient, and even if it exceeds 1.5, no further improvement can be expected.

The photo stabilizer as component (D) functions to improve weathering resistance of a coating film. It is selected from compounds which can be uniformly dissolved or dispersed in a coating film and causes neither inhibition of ultraviolet-curing nor yellowing of a coating film. Such compounds include ultraviolet absorbents and antioxidants. Examples of the former include benzophenone derivatives, phenyl salicylate derivatives, benzotriazole and its derivatives, and the like. Of these, benzotriazole type ultraviolet absorbents are particularly preferred. The antioxidants preferably include hindered amine-type antioxidants. These photo stabilizers are usually used in an amount of from about 0.5 to about 5 parts by weight per 100 parts by weight of the total amount of the components (A), (B), and (C).

The photopolymerization initiator which can be used as component (E) shows absorption in the ultraviolet region of from 260 to 450 nm and includes benzoin and its derivatives, benzophenone derivatives, acetophenone and its derivatives, Michler's ketone, benzil derivatives, tetraalkylthiuram monosulfides, thioxanethones (thioxanthones), and the like. Preferred among them are acetophenone and its derivatives. These photopolymerization initiators may be used either individually or in combinations of two or more thereof. The amount of the component (E) to be added usually ranges from about 0.5 to 5 parts by weight per 100 parts by weight of the total amount of the components (A), (B), and (C).

The ultraviolet-curable coating composition according to the present invention can be prepared by uniformly mixing the above-described components (A) to (E). In the preparation, a diluting solvent may be used for viscosity control in such an amount that total solids may not be less than about 40% by weight. If desired, the composition may further contain additives generally employed in ultraviolet-curable coatings, such as photopolymerization sensitizers, e.g., amine compounds, urea compounds, sulfur compounds, etc.; anti-cratering agents, fluidity-controlling agents, organic peroxides for effecting uniform curing on polymerization, pigments, dyes, and the like.

The ultraviolet-curable coating composition according to the present invention provides a cured film having very excellent weathering characteristics, such as a gloss retention of 90% or more and a color difference ΔE* of 2 or less when tested with a sunshine weatherometer for an exposure time of 1,000 hours. Such superiority can first be achieved by an appropriate combination of the essential components (A) to (E), particularity, in a specific proportion of each components (A), (B) and (C) as described above but has not been substantially attained by any of the conventionally known ultraviolet-curable coatings.

The method of coating the ultraviolet-curable coating composition of the present invention is not particularly restricted. In general, a substrate is previously coated with a baking-curable colored coating. After baking, the composition of the present invention is spray-coated or electrostatically coated thereon with, if necessary, a marking film, etc., adhered thereto. The coating film is then cured by irradiation with ultraviolet rays. If desired, the coating film may be pre-heated to remove the solvent prior to ultraviolet light irradiation, or the ultraviolet light irradiation may be followed by post-heating.

A ultraviolet light emitter to be used for curing is preferably capable of irradiating a surface of a three-dimensional substrate as uniformly as possible. The ultraviolet light source to be used includes a high-pressure mercury lamp, a metal halide lamp, etc.

The polyfunctional (meth)acrylate as component (A) contributes to improve ultraviolet-curable properties and to reduce a requisite amount of a diluting solvent, which leads to realization of a large coating thickness in one coating operation. Further, the component (A) covers up roughness of a substrate surface to produce high quality appearance.

The polyhydric alcohol mono(meth)acrylate as component (B) and the non-yellowing polyisocyanate compound as component (C) play an important role in compensation for insufficiency of curing when ultraviolet irradiation is non-uniform. They are also effective to greatly reduce distortion due to shrinkage on curing thereby to improve adhesion to a substrate and weathering resistance and, at the same time, to make a satisfactory finish on the areas where the coating is applied on a marking film without suffering from defects, such as wrinkles and cracks.

In the present invention, the crosslinking density of a coating film can be controlled appropriately by varying a mixing ratio of the components (A), (B), and (C), to obtain performance properties in accordance with use of the coating composition, such as resistance to gasoline, wearability, and the like.

The photo stabilizer as component (D) makes a contribution to improvement of weathering resistance of a cured film. Of the photo stabilizers, ultraviolet absorbents have generally been regarded as unfavorable for use in ultraviolet-curable compositions in view of their curing properties. Nevertheless, use of such ultraviolet absorbents in the coating composition of the present invention gives rise to no problems in curing of a coating film.

The ultraviolet-curable coating composition comprising the components (A) to (D) having the above-described effects and, in addition, a photopolymerization initiator as component (E) can be coated in large thickness in one coating operation, can be sufficiently cured even when ultraviolet irradiation is non-uniform, and provides a cured coating film highly satisfying various performances, such as appearance, adhesion, and weathering resistance. Therefore, it is very useful as a coating for vehicle bodies (steel plates or plastics) which is especially required to satisfy appearance and weathering characteristics as well as a coating for other substrates, e.g., a metal plate other than a steel plate, and wooden products.

The present invention will now be illustrated in greater detail by way of the following examples, but it should be understood that the present invention is not deemed to be limited thereto. In these examples, all the parts and percents are given by weight unless otherwise indicated.

EXAMPLES 1 TO 5

Components (A) to (E) shown in Table 1 were uniformly mixed to prepare a ultraviolet-curing coating composition (clear coating).

COMPARATIVE EXAMPLES 1 TO 3

Components (A) to (E) shown in Table 1 were uniformly mixed to prepare a comparative ultraviolet-curable coating composition (clear coating).

COMPARATIVE EXAMPLE 4

A water-soluble acrylic melamine resin clear coating ("Aqua No. 7100 Clear" produced by Nippon Oils & Fats Co., Ltd.; total solids: 40%) was used as a comparative coating.

TABLE 1

|  | Example 1 | Example 2 | Example 3 | Example 4 | Example 5 | Comparative Example 1 | Comparative Example 2 | Comparative Example 3 |
|---|---|---|---|---|---|---|---|---|
| Component (A):(part): |  |  |  |  |  |  |  |  |
| $A_1$*1) | 53 | 31.5 | 47 | — | — | 91.6 | — | — |
| $A_2$*2) | — | — | — | 28.5 | 62.5 | — | 5.1 | 33.4 |
| $A_3$*3) | — | 12.3 | — | — | — | — | — | — |
| $A_4$*4) | — | — | — | 11.4 | — | — | — | 13.3 |
| Component (B):(part): |  |  |  |  |  |  |  |  |
| $B_1$*5) | 42 | 50 | — | — | — | 7.4 | — | — |
| $B_2$*6) | — | — | 37 | 39.9 | 31.3 | — | 81.6 | 46.7 |
| Component (C):(part): |  |  |  |  |  |  |  |  |
| $C_1$*7) | 5 | 6.2 | 16 | — | — | 1 | 13.3 | — |
| $C_2$*8) | — | — | — | 20.2 | 6.8 | — | — | 6.6 |
| Component (D):(part**): |  |  |  |  |  |  |  |  |
| $D_1$*9) | 1 | 1.2 | 1 | — | — | — | — | — |
| $D_2$*10) | — | — | 1 | 1.2 | 1.2 | 1 | 1 | — |
| Component (E):(part**): |  |  |  |  |  |  |  |  |

TABLE 1-continued

|  | Example 1 | Example 2 | Example 3 | Example 4 | Example 5 | Comparative Example 1 | Comparative Example 2 | Comparative Example 3 |
|---|---|---|---|---|---|---|---|---|
| $E_1$ *11) | 1 | 1.2 | 1 | — | — | 2 | 1 | — |
| $E_2$ **12) | — | — | — | 1.3 | 1.2 | — | — | 1.3 |
| Solid Weight Ratio of (A)/(B) + (C) | 51/49 | 46/54 | 44/56 | 44/56 | 64/36 | 91/9 | 5/95 | 50/50 |
| Equivalent Ratio of NCO in (C)/OH in (B) | 0.62 | 0.64 | 1.20 | 1.00 | 0.40 | 0.68 | 0.46 | 0.27 |
| Total Solids (wt %) | 64 | 69 | 66 | 73 | 71 | 62 | 70 | 75 |

Note:
**: Part by weight per 100 parts by weight of (A) + (B) + (C).
*1) $A_1$: A solution (total solids: 63%) of polyurethane acrylate having a number average molecular weight of 1,800, which is obtained by reacting 1,008 parts of coronate HK50EX (a polymer of hexamethylene diisocyanate produced by Nippon Polyurethane Ind. Co., Ltd.; isocyanate group content: 10.2%), 348 parts of 2-hydroxypropyl acrylate, 0.2 part of hydroquinone, and 0.1 part of triethylamine at 80° C. for 10 hours.
*2) $A_2$: A solution (total solids: 75%) of epoxy acrylate having a number average molecular weight of 800, which is obtained by reacting 450 parts of Araldite XB-3084 (hydrogenated epoxy resin produced by Ciba Ltd.; epoxy equivalent: 227), 144 parts of acrylic acid, 0.2 part of hydroquinone, 2 parts of triethylamine, and 200 parts of xylene at 150° C. for 5 hours.
*3) $A_3$: Trimethylolpropane triacrylate (number average molecular weight: 300)
*4) $A_4$: Polyethylene glycol (400) diacrylate ("PEG 400DA" produced by Nippon Oils & Fats Co., Ltd.; number average molecular weight: 520)
*5) $B_1$: A solution (total solids: 67%) of a polymer having a hydroxyl number of 65, which is obtained by mixing 13 parts of 2-ethylhexyl acrylate successively with 50 parts of butyl methacrylate, 15 parts of 2-hydroxyethyl methacrylic acid, 20 parts of styrene, 2 parts of azobisisobutyronitrile, and 48 parts of toluene and allowing the mixture to react at 110° C. for 6 hours while stirring.
*6) $B_2$: A solution (total solids: 70%) of a polmer having a hydroxyl number of 113, which is obtained in the same manner as for $B_1$, except for using double the amount of 2-hydroxyethyl methacrylate.
*7) $C_1$: A polymer of hexamethylene diisocyanate ("Sumidur N" produced by Sumitomo Bayer Urethane Co., Ltd.)
*8) $C_2$: A polymer of isophorone diisocyanate ("Desmodur Z4370" produced by Sumitomo Bayer Urethane Co., Ltd.)
*9) $D_1$: Hindered amine type antioxidant ("Sanol LS-292" produced by Sankyo Co., Ltd.)
*10) $D_2$: Benzotriazole type ultraviolet absorbent ("Tinuvin 900" produced by Ciba Ltd.)
*11) $E_1$: Acetophenone type photopolymerization initiator ("Irgacure 184" produced by Ciba Ltd.)
*12) $E_2$: Acetophenone type photopolymerization initiator ("Darocur 1173" produced by Merck AG)

Test specimens were prepared as follows using each of the coatings of Examples 1 to 5 and Comparative Examples 1 to 4 and were evaluated for coating performances according to the test methods described below. The results of evaluation are shown in Table 2.

PREPARATION OF SPECIMENS

A fuel tank of 17 l in volume for use in an autocycle having 498 cc in total exhaustion (hereinafter referred to as substrate A) or a steel plate SPCC-SB measuring 70 mm in length, 150 mm in width, and 1 mm in thickness (hereinafter referred to as substrate B) was treated with zinc phosphate and then electrostatically coated with a water-soluble acrylic resin coating ("Aqua No. 7100 Black" produced by Nippon Oils & Fats Co., Ltd.) to a dry thickness of 30 μm, followed by heating at 150° C. for 30 minutes.

On the acrylic resin-coated substrate was further applied each of the coatings of the Examples and Comparative Examples to a prescribed dry thickness by spray-coating or electrostatic coating with or without a marking film (produced by Sumitomo 3M Co., Ltd.) being adhered on the acrylic resin film followed by setting at room temperature for 10 minutes.

Each of the substrates coated with the coatings of Examples 1 and 3 to 5 and Comparative Examples 1 to 3 was heated with a far infrared heater ("Infrastein" produced by Nippon Gaishi Co., Ltd. ) and uniformly irradiated with ultraviolet light for 2 seconds using a high-pressure mercury lamp ("Hi-Cure Lamp" manufactured by Nihon Denchi Co., Ltd.; length: 20 cm; 3 bulbs total of 4.8 kW) placed at a distance of about 20 cm from the substrate. After ultraviolet irradiation, the substate was further heated with a far infrared heater at a substrate temperature of 120° C. for 5 minutes.

The substrate coated with the coating of Example 2 was treated in the same manner as above, except that ultraviolet light irradiation was carried out for 3 seconds using a metal halide lamp (manufactured by Nihon Denchi Co., Ltd.; length: 20 cm; 3 bulbs each of 3.8 kW) as a ultraviolet light source.

The substrate coated with the coating of Comparative Example 4 was heated with a far infrared heater at a substrate temperature of 150° C. for 30 minutes.

EVALUATION OF PERFORMANCE PROPERTIES

Maximum Film Thickness

The coating was applied on substrate B by spray-coating or electrostatic coating with no marking film. The maximum thickness of a normal coating film formed in one coating operation was measured. The term "normal" for the coating film means that the film is free from any abnormality, such as sags, runs, and foaming, either during coating or during curing. A maximum thickness of 60 μm or more was taken as an acceptance criterion.

Gloss Retention

Substrate B onto which a marking film had been adhered was electrostatically coated with the coating to a dry thickness of 70 μm in Examples 1 to 5 and Comparative Examples 1 to 3 or 40 μm in Comparative Example 4. The test specimen (cured) was subjected to a weathering test using a sunshine weatherometer according to JIS K5400, and the gloss retention after a weatherometer exposure time of 1,000 hours (a percent retention based on the initial gloss) was determined.

Weathering test was carried out on the same specimens in the same manner as for evaluation of gloss retention according to JIS D 0202 which comprises:
- Operate a weatherometer (Suga Test Instrument Co., Ltd.) using carbon arc discharge as the light source (wavelength, 300–700 nm).
- Distance between the center of the arc and the sample surface is about 480 mm.
- One cycle comprises irradiation of 102 minutes and water spray of 18 minutes, the total being 120 minutes (2 h).
- Temperature in the tester is 63°±3° C.
- A gloss retention value (%) is calculated from the gloss values of a sample before and after 1000 h (=500 cycles) testing.

The color difference $\Delta E^*$ after a sunshine weatherometer exposure time of 1,000 hours was calculated from the equation:

$$\Delta E^* = \sqrt{(\Delta L^*)^2 + (\Delta a^*)^2 + (\Delta b^*)^2}$$

wherein $\Delta L^* = (L_1^* - L_2^*)$;

$\Delta a^* = (a_1^* - a_2^*)$;

$\Delta b^* = (b_1^* - b_2^*)$;

$L_1^*$, $a_1^*$ and $b_1^*$ each represents an initial value; and $L_2^*$, $a_2^*$ and $b_2^*$ each represents a value after testing.

Distinctness of Image Colors

Appearance of the same specimens as used for evaluation of gloss retention was evaluated for distinctness of image gloss by means of a portable gloss meter (PGD-IV manufactured by Tokyo Koden K.K.). Gloss of 0.9 or higher was taken as an acceptance criterion.

Adhesion

The same specimens as used for evaluation of gloss retention were subjected to an adhesion test which comprises making a one-hundred-sectioned grid (10×10 sections, where a mesh is 1 mm) on the coated surface, and spread over its full length a cellophane adhesive tape. Immediately, holding one end of the tape perpendicularly to the coating surface, peel off the tape. When all sections remain, adhesion is evaluated as "good". The test is performed in accordance with JIS K5400 6.15. Adhesion of 100 was rated as "good".

Coating Property on Tape

Substrate A or B on which a marking film had been adhered was electrostatically coated with the coaing to a dry thickness of 70 μm in Examples 1 to 5 and Comparative Examples 1 to 3 or 40 μm in Comparative Example 4. The coating film on the area where the marking film had been adhered was visually observed. A coating film suffering from no abnormality, such as cracks and wrinkles, was rated as "good".

Weathering Resistance

The same test specimens as used for evaluation of coating properties on tape were fixed to a mount at an incline of 30 degrees from the horizon and exposed to weather on the shore of Okinawa for 2 years. The coating film free from any abnormality, such as color change and cracks, and remarkable reduction of gloss was rated as "good".

It can be seen from the results of Table 2 that the ultraviolet-curable coating compositions according to the present invention exhibit excellent performance properties, whereas, the water-soluble acrylic/melamine resin clear coating of Comparative Example 4 failed to satisfy requirements of distinctness of image gloss and maximum film thickness. The coating film of Comparative Example 1 in which the proportion of the component (B) is less than the lower limit of the present invention shows poor adhesion to a substrate, has cracks when formed on a marking film, and undergoes overall cracking when exposed to weather for 1 year. The coating film of Comparative Example 2 in which the proportion of the component (A) is less than the lower limit of the present invention is unsatisfactory in distinctness of image gloss and maximum film thickness. The coating composition of Comparative Example 3 which does not contain the component (D) of the present invention undergoes cracking on the entire film surface when exposed to weather for 1 year.

While the invention has been described in detail and with reference to specific embodiments thereof, it will be apparent to one skilled in the art that various changes and modifications can be made therein without departing from the spirit and scope thereof.

What is claimed is:

1. A process for forming a resin coating to a dry thickness of at least 60 μm in a single coating step, said process comprising
   (i) coating on a substrate an ultraviolet-curable coating composition comprising:
   (A) an ultraviolet-curable polyfunctional (meth)acrylate which is at least one selected from the group consisting of:
      (a) an ester between a polyhydric alcohol and a (meth)acrylic acid,
      (b) a polyester acrylate composed of n mols of adipic acid, (n+1) mols of hexanediol and 2 mols of (meth)acrylic acid,
      (c) an epoxy(meth)acrylate obtained by esterifying an epoxy group of an epoxy compound with a (meth)acrylic acid, and
      (d) a polyurethane (meth)acrylate obtained by reacting hexamethylene diisocyanate with a (meth)acrylate having a hydroxyl group,
   and which contains at least two (meth)acryloyl groups in the molecule thereof and has a number average molecular weight of from 190 to 2,000,
   (B) a homopolymer of a hydroxyl-containing monomer selected from the group consisting of hydroxyethyl (meth)acrylate, hydroxypropyl

TABLE 2

| | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| Maximum Thickness (μm) | 80 | 85 | 80 | 80 | 75 | 80 | 50 | 80 | 40 |
| Gloss Retention (%) | 97 | 98 | 98 | 93 | 92 | 43 | 92 | 76 | 97 |
| Color Difference ΔE* | 1.2 | 1.1 | 0.8 | 1.2 | 1.4 | 7.2 | 0.9 | 4.5 | 1.2 |
| Distinctness of Image Gloss | 1.2 | 1.0 | 1.0 | 1.1 | 1.0 | 1.0 | 0.5 | 1.1 | 0.4 |
| Adhesion | 100 | 100 | 100 | 100 | 100 | 0 | 100 | 100 | 100 |
| Coating Property on Tape: | | | | | | | | | |
| Substrate A | good | good | good | good | good | poor | good | good | good |
| Substrate B | good | good | good | good | good | poor | good | good | good |
| Weathering Resistance: | | | | | | | | | |
| Substrate A | good | good | good | good | good | poor | good | poor | good |
| Substrate B | good | good | good | good | good | poor | good | poor | good |

(meth) acrylate, polyethylene glycol mono(meth)acrylate, polypropylene glycol mono(meth) acrylate, neopentyl glycol mono(meth)acrylate, and glycerin mono(meth)acrylate, or a copolymer comprising said hydroxyl-containing monomer and one or more of other monomers copolymerizable therewith selected from the group consisting of methyl (meth)acrylate, ethyl (meth)acrylate, propyl(meth)acrylate, butyl (meth)acrylate, 2-ethylhexyl (meth)acrylate, and styrene, said homopolymer or copolymer having a hydroxyl number of from 10 to 200, (C) a non-yellowing polyisocyanate compound, (D) a photo stabilizer selected from an ultraviolet absorbent and an antioxidant, and (E) a photopolymerization initiator, wherein said component (A) is present in an amount of from 20 to 80% by weight, and the total amount of components (B) and (C) is from 80 to 20% by weight, based on the total amount of the components (A), (B), and (C) with said component (C) having an isocyanate equivalent of from 0.2 to 1.5 per hydroxyl equivalent of the component (B), said composition providing a cured film having a gloss retention of 90% or more and a color difference $\Delta E^*$ of 2 or less when tested with a sunshine weatherometer for an exposure time of 1,000 hours, and (ii) curing said coating composition with UV irradiation.

2. A process as in claim 1, wherein the component (A) is present in an amount of from 30 to 70% by weight based on the total amount of the components (A), (B), and (C).

3. A process as in claim 1, wherein the total amount of components (B) and (C) is from 70 to 30% by weight based on the total amount of the components (A), (B) and (C).

4. A process as in claim 1, wherein the component (C) has an isocyanate equivalent of from 0.4 to 1.2 per hydroxyl equivalent of the component (B).

5. A process as in claim 1, wherein the component (D) is selected from hindered amine antioxidants and benzotriazole ultraviolet absorbents.

6. A process as in claim 1, wherein the component (D) is present in an amount of from 0.5 to 5 parts by weight per 100 parts by weight of the total amount of the components (A), (B), and (C).

7. A process as in claim 1, wherein the component (E) is selected from acetophenone and derivatives thereof.

8. A process as in claim 1, wherein the component (E) is present in an amount of from 0.5 to 5 parts by weight per 100 parts by weight of the total amount of the components (A), (B), and (C).

9. A process as in claim 1, wherein the component (B) is a copolymer comprising 2-hydroxyethyl (meth)acrylate and/or 2-hydroxypropyl (meth)acrylate as a hydroxyl-containing monomer and a copolymerizable monomer or monomers selected from the group consisting of methyl (meth)acrylate, ethyl (meth)acrylate, propyl (meth)acrylate, butyl (meth)acrylate, 2-ethylhexyl (meth)acrylate and styrene.

10. A process as in claim 1, wherein said dry coating thickness is at least 70 μm.

11. A process as in claim 1, wherein said dry coating thickness is at least 80 μm.

12. A process as in claim 1, wherein the component (D) is a hindered amine antioxidant.

13. An ultraviolet-curable coating composition as in claim 12, wherein the component (D) is present in an amount of from 0.5 to 5 parts by weight per 100 parts by weight of the total amount of the components (A), (B), and (C).

* * * * *